United States Patent [19]
Katayama et al.

[11] Patent Number: 5,298,841
[45] Date of Patent: Mar. 29, 1994

[54] APPARATUS FOR CONTROLLING THE SPEED OF A MOVING OBJECT

[75] Inventors: Hiroshi Katayama, Hitachi; Fumio Tajima, Ibaraki; Taizo Miyazaki; Shigeki Morinaga, both of Hitachi; Nobuyoshi Mutoh, Katsuta, all of Japan; Seiichi Narushima, Landsberg am Lech, Fed. Rep. of Germany; Yuji Sato, Mito, Japan; Toshio Nakamoto, Katsuta, Japan; Takashi Takahashi, Katsuta, Japan; Toshio Osada, Katsuta, Japan

[73] Assignee: Hitachi, Ltd., Tokyo, Japan

[21] Appl. No.: 687,239

[22] Filed: Apr. 18, 1991

[30] Foreign Application Priority Data

Apr. 18, 1990 [JP] Japan .................................. 2-102460
Sep. 19, 1990 [JP] Japan .................................. 2-249081

[51] Int. Cl.$^5$ ............................................. H02P 5/00
[52] U.S. Cl. ..................................... 318/268; 318/254; 388/907.5
[58] Field of Search ............... 318/138, 254, 439, 607, 318/609, 611, 615, 616, 617, 618, 619, 629, 268; 388/806, 815, 907.5

[56] References Cited

U.S. PATENT DOCUMENTS

| | | | |
|---|---|---|---|
| 4,163,928 | 8/1979 | Patterson et al. | 318/573 |
| 4,634,952 | 1/1987 | Yoshino et al. | 318/811 |
| 4,818,908 | 4/1989 | Tamae et al. | 318/138 X |
| 4,849,871 | 7/1989 | Wallingford | 318/811 X |
| 4,885,516 | 12/1989 | El-Sadi | 318/615 |
| 4,914,361 | 4/1990 | Tajima et al. | 318/254 |
| 4,922,169 | 5/1990 | Freeman | 318/254 |
| 4,980,617 | 12/1990 | Tajima et al. | 318/609 X |
| 5,023,924 | 6/1991 | Tajima et al. | 318/254 X |

FOREIGN PATENT DOCUMENTS 1-218380 8/1989 Japan .

*Primary Examiner*—Bentsu Ro
*Attorney, Agent, or Firm*—Antonelli, Terry, Stout & Kraus

[57] ABSTRACT

A speed control apparatus in which for sampling features of a speed fluctuation and generating a speed fluctuation correcting signal, an arithmetic operation can be simplified and can be performed by an inexpensive arithmetic and operation unit, thus requiring no expensive arithmetic operation unit. The speed control apparatus is also capable of reducing torque ripples and speed fluctuations quickly even when the load of an object to be controlled is changed.

11 Claims, 10 Drawing Sheets

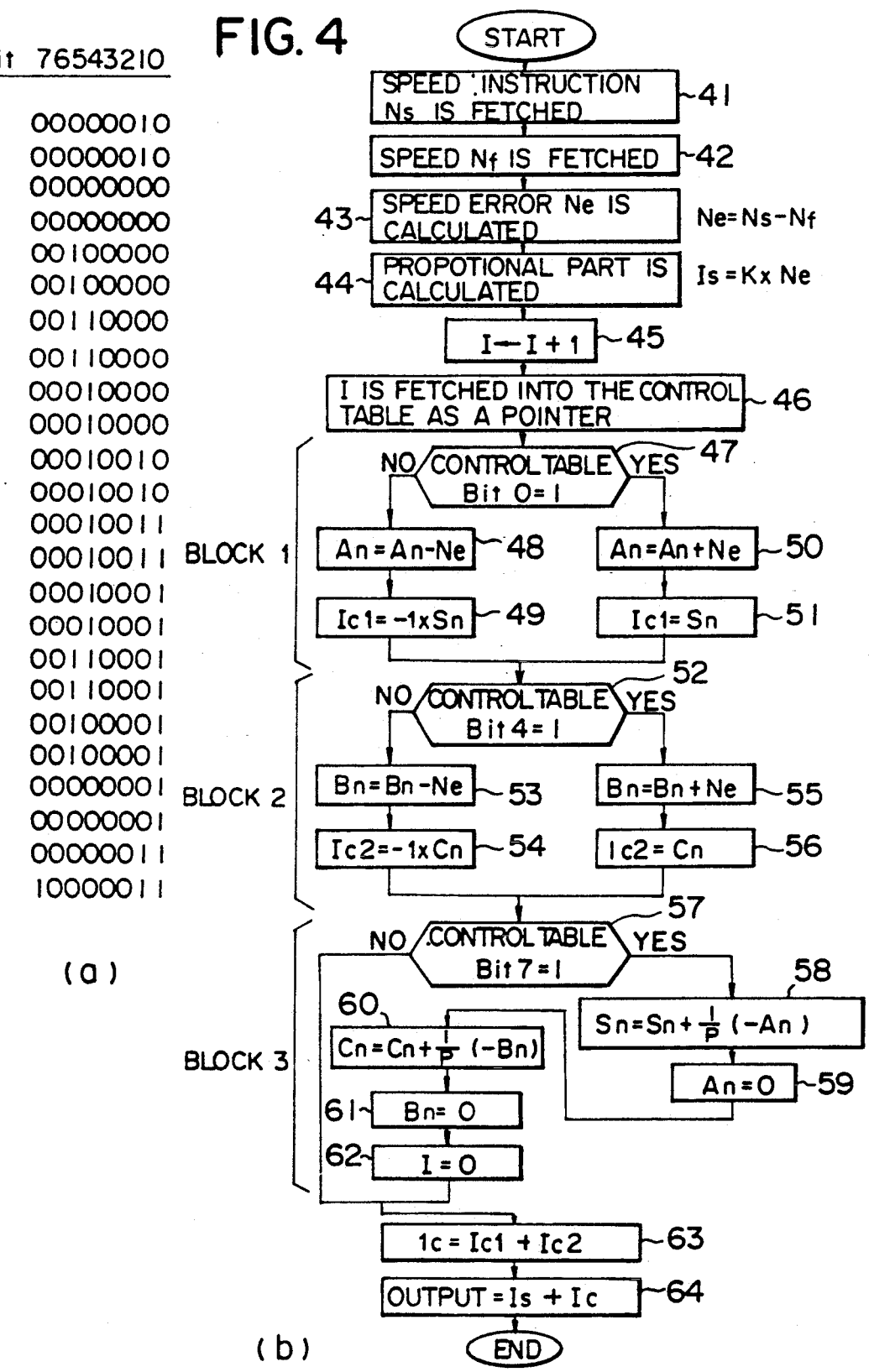

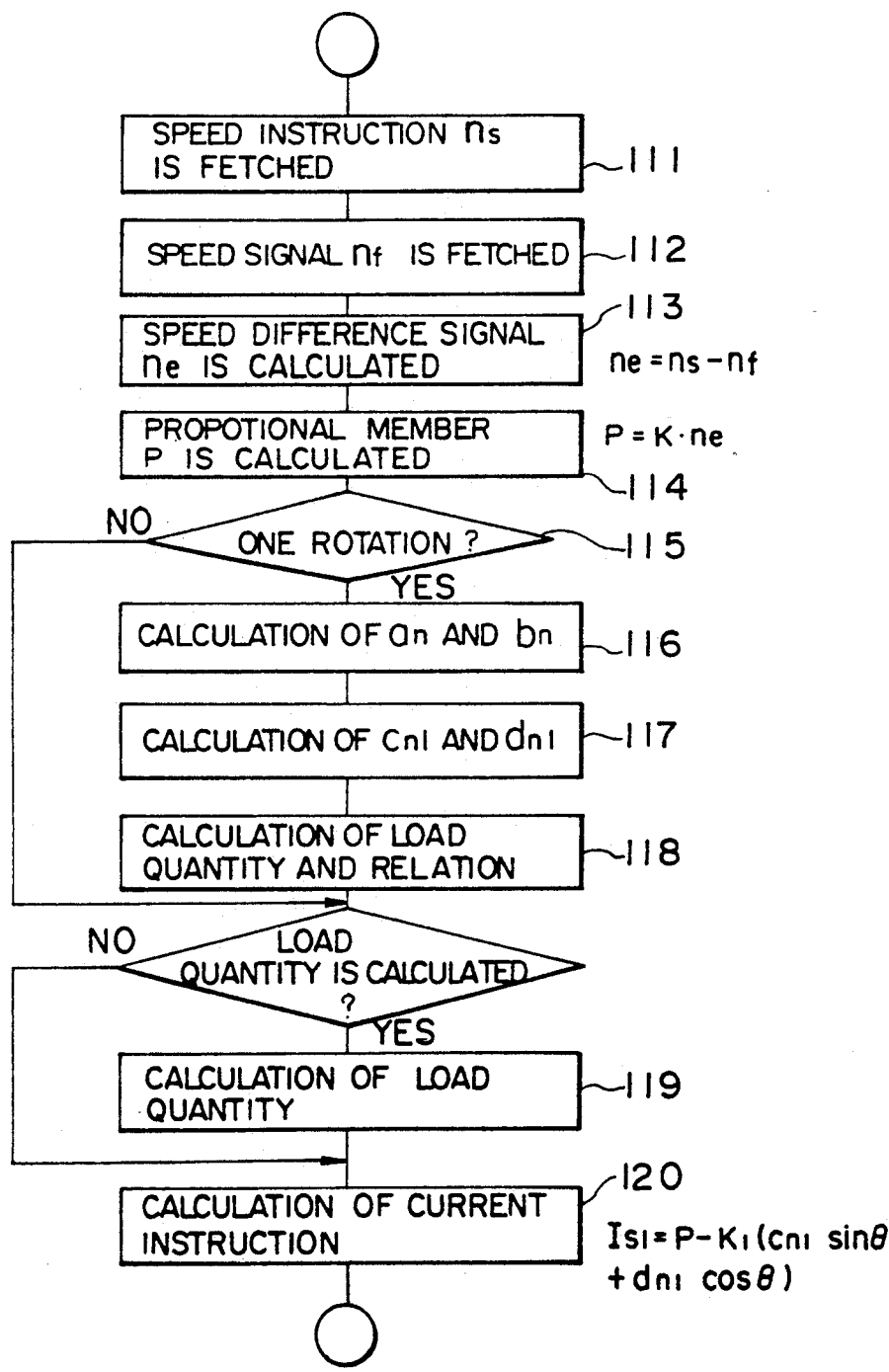

APPARATUS FOR CONTROLLING THE SPEED OF A MOVING OBJECT

BACKGROUND OF THE INVENTION

1. Field of the Invention

This invention relates generally to an apparatus for controlling the speed of a moving object, and more particularly to an apparatus for controlling the speed of a control unit, such as a servo motor, in which there must not be any speed change or position change while the control unit is operating. Here in this specification, the term "moving object" means not only an object which moves by itself or varies in speed, but also an object which moves a load or varies in speed in association with a load.

2. Description of the Related Art

Attempts have been made to keep constant the rotating speed of a drive motor for a videotape recorder (hereinafter called VTR). If there is any speed fluctuation (i.e., irregular rotation, speed ripple or torque ripple), an image would be disordered, thus markedly deteriorating the reliability and quality of VTR.

To this end, in many of the conventional apparatuses, a d.c. motor has been used, and recently incorporating a brushless motor, which can change the speed freely and simply, has become commonplace.

A brushless motor has no mechanical brush and can hence eliminate various kinds of problems due to the wear of a brush and a commutator or the metal dust resulting from such wear. However, in a 120°-conducting brushless motor, the number of crossovers of magnetic bundles varies, depending on the position of a rotor, so that a torque ripple would occur, thus causing an irregular rotation (speed fluctuation) during operation.

Now assuming that the number of crossovers of magnetic bundles of a drive-phase coil is K ($\theta$) ($\theta$ is the position of a moving object), a torque K($\theta$)i (i is a current flowing in the coil) will be produced. If the current is constant, a torque ripple will be produced in proportion to K($\theta$).

This torque ripple leads to disturbance, causing a speed fluctuation.

Consequently, the speed fluctuation has a periodicity with respect to the rotational position of the motor. A technique of correcting the speed fluctuation, utilizing this characteristic, has been proposed by Japanese Patent Laid-Open Publication No. 218380/1989. According to this technique, the feature of the speed fluctuation is sampled by Fourier progress expansion, and a proportional and integrating control operation is made in such a manner that this sampled value will be zero, whereupon the current which flows in the coil is varied upon receipt of a signal obtained from Fourier reverse transformation of this operation output, thus correcting the speed fluctuation.

In the technique of the Japanese publication, an expensive arithmetic and operation unit is necessary in which very many multiplications and additions are executed at high speed, when performing Fourier progress expansion and Fourier reverse transformation, thus a lot of time is taken to perform such mathematical operations.

Further, in the method of the Japanese publication, assuming that the average load fluctuation is small, an optimum operation can always be achieved if a correcting value is determined only once. In the absence of a drastic load fluctuation such as in a servo motor, production of a correcting torque cannot catch up with the fluctuation so that a smooth operation cannot be realized.

SUMMARY OF THE INVENTION

It is a first object of this invention to provide a speed control apparatus in which for sampling features of a speed fluctuation and generating a speed fluctuation correcting signal, an arithmetic operation can be simplified and can be performed by an inexpensive arithmetic and operation unit, thus requiring no expensive arithmetic and operation unit.

A second object of the invention is to provide a speed control apparatus which can reduce torque ripples and speed fluctuations quickly even when the load of an object to be controlled is changed.

A more specific object of the invention is to provide a VTR in which the rotation of a servo motor is smooth and there are very few image disorders.

According to a first aspect of the invention, there is provided an apparatus for controlling the speed of a moving object, comprising a speed detecting means for detecting a speed of the moving object, a speed control means for generating a current instruction or a voltage instruction from a speed instruction signal and a speed detection signal which is obtained from the speed detecting means, and a drive means for varying the speed of the moving object according to the instructions of the speed control means, wherein the speed control means includes: a speed error detecting means for obtaining a speed error signal from a difference between the speed instruction signal and the speed detection signal which is obtained from the speed detecting means; a step function generating means for generating a step function value; a fluctuating component detecting means for detecting a speed error fluctuating component by integrating a product of the function value according to the step function generating means and the speed error signal according to the speed error detecting means; and a correcting signal generating means for generating a speed error correcting signal by multiplying a speed error fluctuation component according to the fluctuating component detecting means by the function value according to the step function generating means.

According to a second aspect of the invention, there is provided an apparatus for controlling the speed of a moving object, comprising a speed detecting means for detecting a speed of the moving object, and a speed control means for generating a current instruction or a voltage instruction, based on a difference between a speed detection signal according to the speed detecting means and a speed instruction signal given from an external source, wherein the speed control means includes: a harmonic wave component detecting means for detecting a harmonic wave component contained in the difference between the speed detection signal and the speed instruction signal; and means for adding to the current instruction or the voltage instruction a correcting value for reducing the detected harmonic wave component.

It is desirable that the apparatus for controlling the speed of the moving object further comprising as described hereinafter.

The speed detecting means detects separately a sine wave component and a cosine wave component of the speed of the moving body. The speed control means gives a current instruction or a voltage instruction to the moving object separately for the sine wave component and the cosine wave component. The adding means adds a correcting current instruction or a correcting voltage instruction separately for the sine wave component and the cosine wave component.

Specifically, the speed control means includes a load quantity detecting means for detecting the quantity of load of the moving object, and a correcting value modifying means for modifying the correcting value, based on a relation between the correcting value and the quantity of load.

Preferably, the speed control means further includes means for stopping the operation of the correction value modifying means, thus achieving high-speed and accurate control.

In either case, the moving object may be an electric motor drivable rotationally or linearly, particularly a brushless motor.

From an alternative point of view, there is provided an apparatus for controlling the drive of an object unit, comprising: a control unit for driving and controlling the object unit; a driver for giving a current or a voltage to the object unit, based on an instruction value from the control unit; an element for detecting a real operating state of the object unit in terms of a current or a voltage; means for detecting a harmonic wave contained in the detected electrical signal; means for generating a correcting signal for canceling the detected harmonic wave component; means for detecting a quantity of load of the object unit; and means for modifying the correcting signal, based on a relation between the detected quantity of load and the correcting signal.

This invention is particularly suitable for controlling the rotational speed of a servo motor for VTR.

In the speed control apparatus utilizing a step function, assuming that the function generating means generates digital values $-1$, 0 and 1, multiplication by 1 requires no arithmetic operation, multiplication by 0 can be realized by substituting 0, and multiplication by $-1$ can be realized by inverting the symbol. Therefore, only a simple arithmetic and operation unit is needed for such multiplication.

In the second arrangement, the harmonic wave component detecting means detects a harmonic wave (frequency) component contained in a real speed difference of the electric motor and adjusts a current instruction or a voltage instruction to be given to a driver from an electronic unit, such as a microcomputer, for eliminating or reducing the detected harmonic wave component.

Assuming that the relation between a quantity of load and a correcting value is previously standardized and stored in the form of a table, it is possible to generate a suitably corrected torque even when the load is suddenly changed, thus achieving a smooth movement such as rotation.

The above and other advantages, features and additional objects of this invention will be manifest to those versed in the art upon making reference to the following detailed description and the accompanying drawings in which a few preferred embodiments incorporating the principles of this invention are shown by way of illustrative example.

BRIEF DESCRIPTION OF THE DRAWINGS

FIG. 4 is a table and a flowchart showing the control of the microcomputer for reducing a speed fluctuation;

FIG. 11 is a flowchart showing processing procedures when this invention is realized with a microcomputer.

DETAILED DESCRIPTION OF THE PREFERRED EMBODIMENTS

The principles of this invention are particularly useful when embodied in an apparatus for controlling the speed of a moving object (hereinafter called "speed control apparatus").

Figure 1:
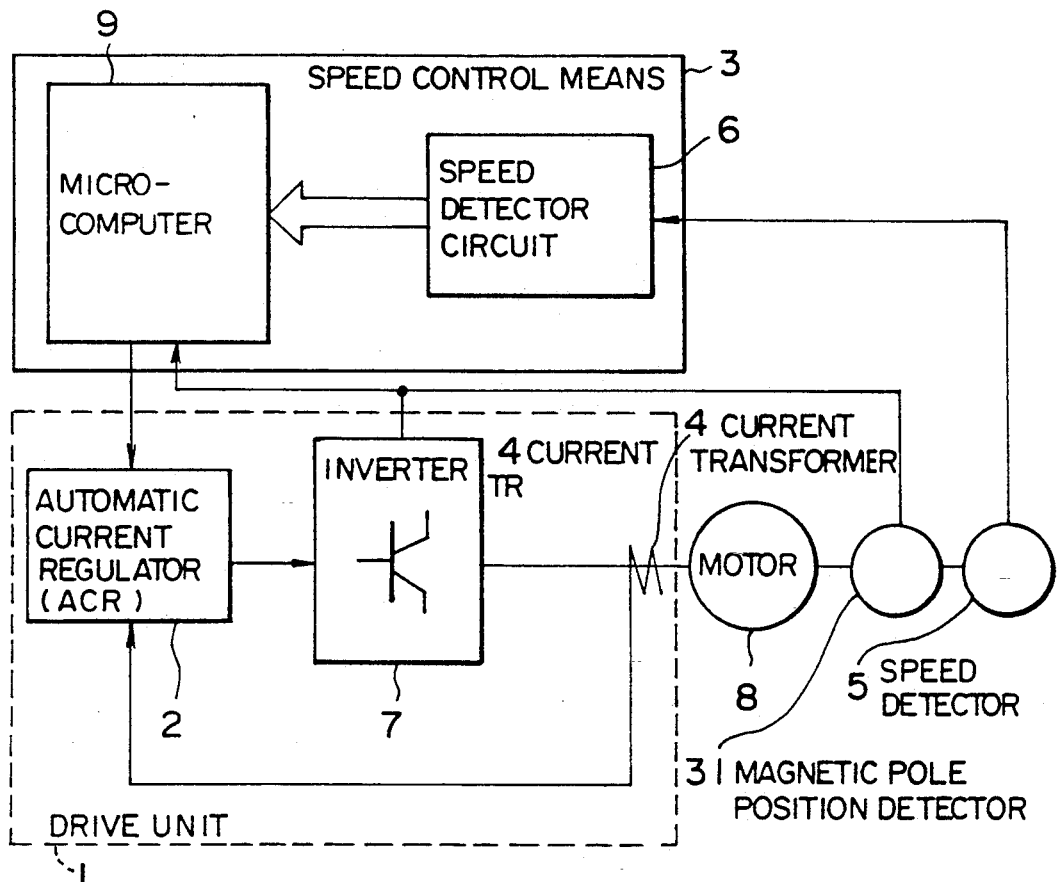
FIG. 1 is a block diagram showing a speed control apparatus according to a first embodiment of this invention.

FIG. 1 shows a first embodiment, according to which the speed control apparatus is equipped with a step function generating means.

As shown in FIG. 1, the speed control apparatus comprises a microcomputer 9 serving as a speed control means, a magnetic pole position detector 31 for detecting the rotational or angular position of a non-illustrated rotor of a brushless motor 8 whose speed is to be controlled, a drive unit 1 serving as a drive means, and a speed detector 5 and a detecting circuit 6 serving as a speed detecting means.

The motor 8 may be either a rotational type or a linear type. The motor 8 may also may have a brush, but will preferably be brushless.

The brushless motor 8 detects the position of the rotor electronically and causes a current to flow in two phase windings selected depending on the position of the rotor.

The output of the magnetic pole position detector 31 is utilized in switching a phase current of the motor 8.

The speed detector 5 is an encoder mounted on a rotary shaft of the motor 8 and outputs a pulse. Alternatively, the speed detector 5 may be a frequency-generator, a tacho-generator or a pulse generator.

The speed detecting circuit 6 is a counter 10 (FIG. 3), for example, and finds the total number of pulses or an interpulse distance, based on the pulses detected within a constant sampling time by the speed detector 5, thereby outputting a speed signal Nf as a speed detecting signal.

The drive unit 1 includes an automatic current regulator 2, an inverter 7, and a current transformer 4.

The inverter 7 is a driver for driving the motor 8. The inverter 7 includes ordinarily six switching elements constituting three positive arms and three negative arms, being capable of varying the size of the individual arms.

The automatic current regulator 2 detects a difference between a current instruction and a current detection value obtained by the current transformer 4 and thereby performs a feedback control. If a high-precision motor control is not required, the automatic current regulator 2 and the current transformer 4 may be omitted.

The speed control means 3 is composed of the microcomputer 9 and the speed detecting circuit 6.

The speed detecting circuit 6 and a speed comparing circuit 51 (described below) in the microcomputer 9 jointly constitute a speed error detecting means.

The microcomputer 9 processes a speed signal Nf, which is an output signal of the speed detecting circuit 6, and outputs a current instruction to the automatic current regulating circuit 2.

Figure 2:
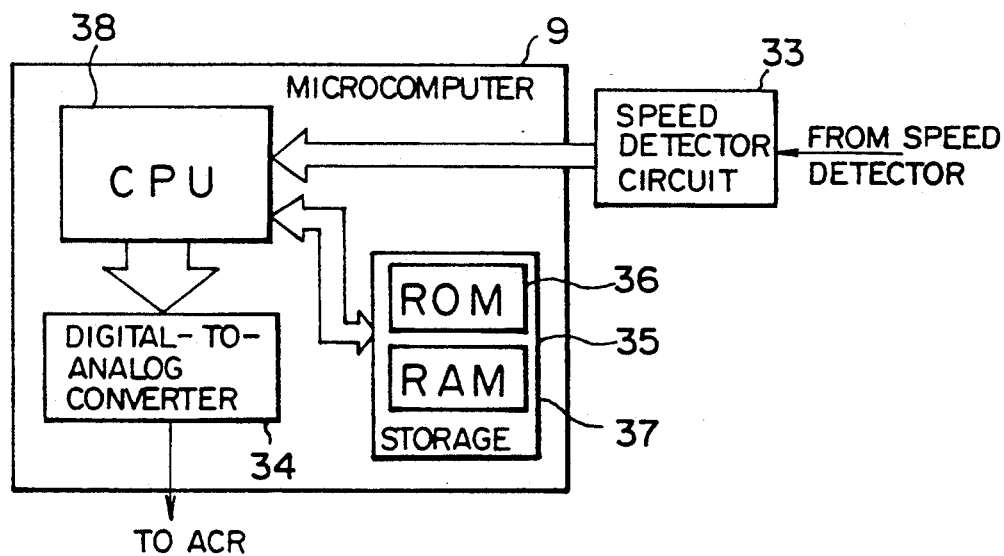
FIG. 2 is a block diagram showing the internal structure of a microcomputer of the speed control apparatus of the first embodiment.

The microcomputer 9, as shown in FIG. 2, is composed of a central processing unit (CPU) 38, a digital-to-analog converter 34 and a storage 35.

The storage 35 includes a ROM 36 and a RAM 37. In the ROM 36, an operation program of the CPU 38, a speed instruction signal Ns and a table of Walsh function are stored.

The CPU 38 receives a speed signal Nf from the speed detecting circuit 6, stores the speed signal Nf in the ROM 36 of the storage 35 and compares the speed signal Nf with a speed instruction signal Ns, thereby calculating a speed error signal. The CPU 38 also includes an element for detecting a harmonic wave component contained in a difference between a real speed of the motor 8 as detected. In the illustrated example, the counter 10 is external to the microcomputer 9; but it may be built in the microcomputer 9.

Based on this speed error signal Ne, the CPU 38 generates a speed error correcting signal Ic. Then the successive speed error correcting signals Ic are stored one after another in the RAM 37 of the storage 35 and are renewed to the latest data.

In the first embodiment, the speed instruction signal Ns is stored in the ROM 36; however this speed instruction signal Ns may be given from an external source.

Preferably, the microcomputer 9 and the speed detecting circuit 6 may be integrated on a single semiconductor chip, and the automatic current regulator 2 and the inverter 7 may be integrated on another single semiconductor chip.

Figure 3:
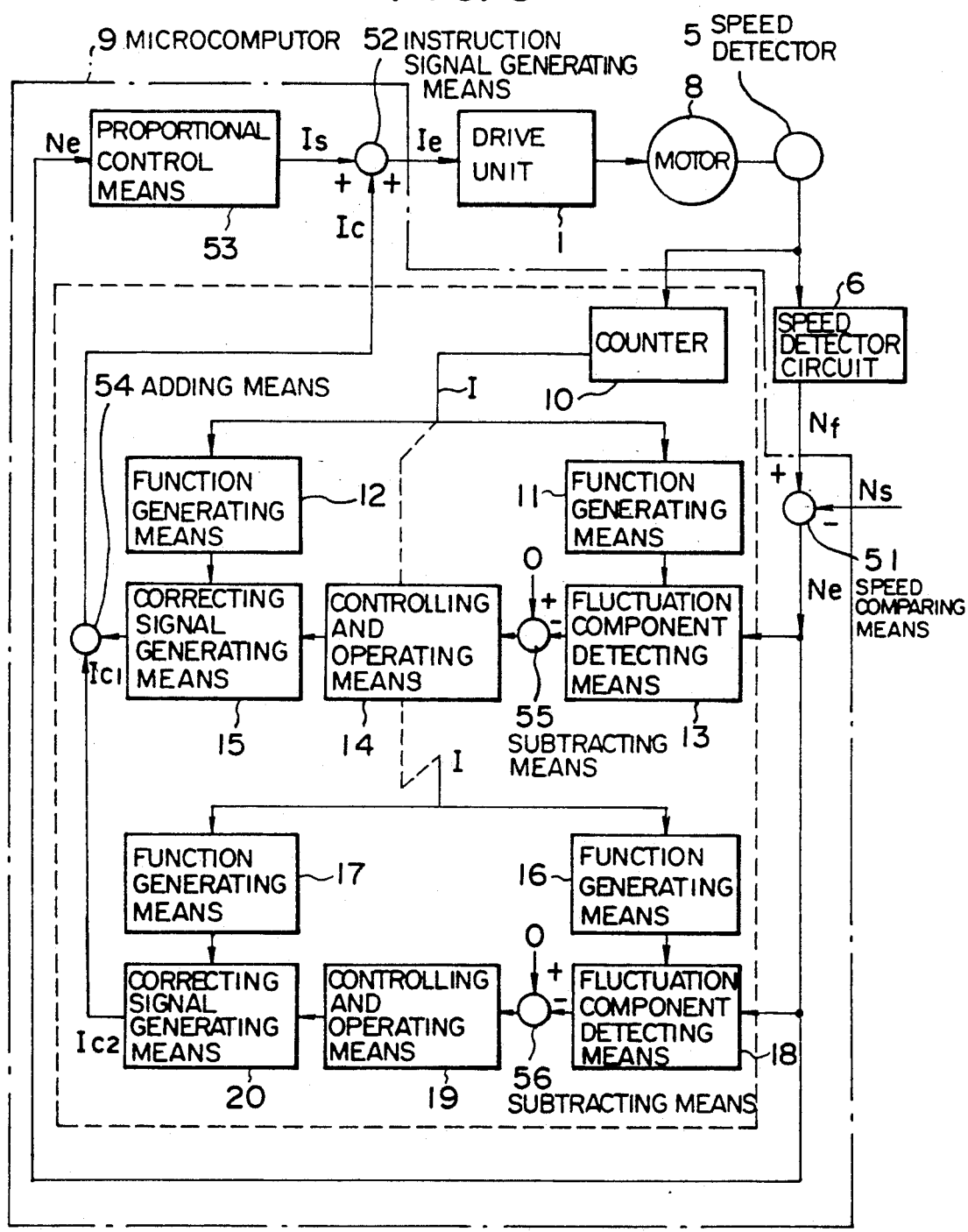
FIG. 3 is a block diagram showing the internal processes of the microcomputer.

Various functions to be performed by the microcomputer 9 will now be described in connection with FIG. 3. In FIG. 3, there is no illustration of either the magnetic pole position detector 31 or the current transformer 4.

The speed detecting circuit 6 outputs a speed signal Nf from the speed detector 5, based on the obtained pulse.

The speed signal Nf is fetched in the microcomputer 9. In the microcomputer 9, by a processing method using software, a speed error signal Ne is calculated from a difference between a speed instruction signal Ns from the ROM 36 and a speed signal Nf from the speed detecting circuit 6 by the speed comparing means 51. Based on this speed error signal Ne, a speed error correcting signal Ic is generated by the portion indicated by dotted lines in FIG. 3.

Then, the speed error signal Ne is multiplied by K by a proportional control means 53. The resulting speed error signal is added to the speed error correcting signal Ic by an instruction signal generating means 52 to generate a current instruction Is. The drive unit 1 outputs a current for producing a necessary torque based on this instruction.

An algorithm for controlling speed fluctuations according to this invention will now be described.

The speed signal Nf which varies ordinarily in a period of 1 can be expanded as follows:

$$Nf(\theta) = n0 + \sum_{n=1}^{\infty} \{a_n cal(n, \theta) + b_n sal(n, \theta)\} \quad (1)$$

where $$n0 = \int_0^1 Nf(\theta)d\theta \quad (2)$$

$$a_n = \int_0^1 Nf(\theta)cal(n, \theta)d\theta \quad (3)$$

$$b_n = \int_0^1 Nf(\theta)sal(n, \theta)d\theta \quad (4)$$

$(n = 1, 2, 3, \ldots)$

In the above equations, n0 is a linear component of the speed signal Nf, $a_n$ is the strength of correlation between a speed signal Nf and a cosine Walsh function $(cal(n,\theta))$ of an alternate number n, and $b_n$ is the strength of correlation between a speed signal Nf and a sing Walsh function $(sal(n,\theta))$ of an alternate number n.

Figure 7:
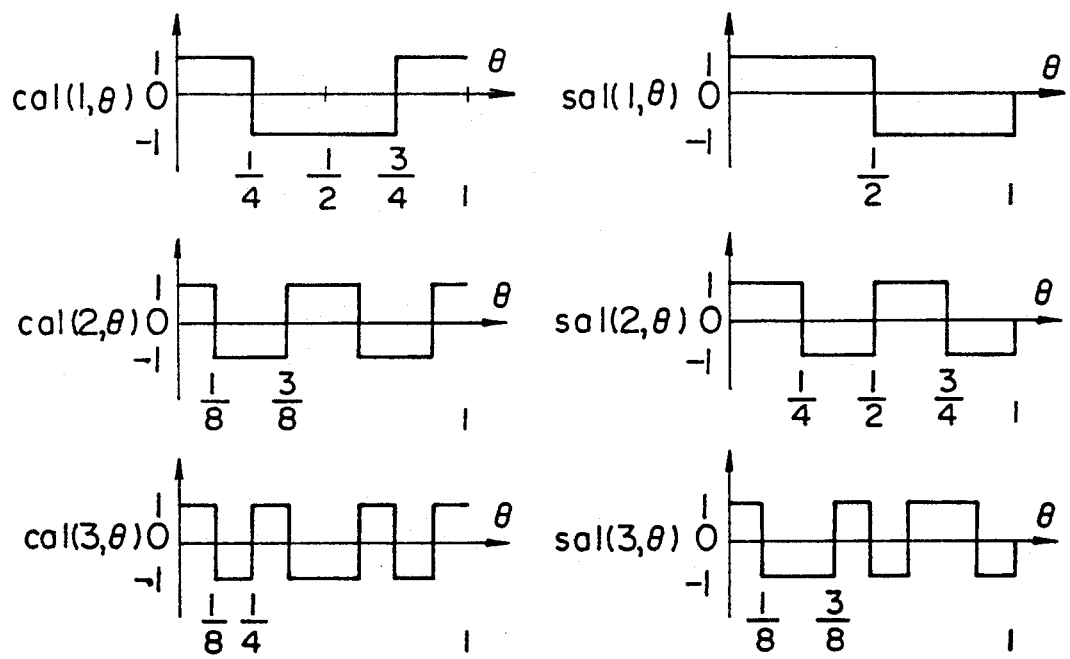
FIG. 7 is graphs showing a typical cosine Walsh function and a sine Walsh function.

The graphs $cal(n,\theta)$ and $sal(n,\theta)$ where n=1, 2 and 3 are shown in FIG. 7.

The alternate number n represents a half of a zero-point number in a region $0 \leq \theta \leq 1$.

In the first embodiment, Ns=n0, namely, the linear component of the speed signal Nf coincides with the speed instruction signal Ns. This invention should by no means be limited to this example.

In FIG. 3, because Ns=n0, it follows that Ne=Nf−Ns=Nf−n0. Namely only the equations (3) and (4) above are speed fluctuation components.

Further, in $cal(n,\theta)$ and $sal(n,\theta)$, $$\int_0^1 n0 \, cal(n, \theta)d\theta = 0$$

$$\int_0^1 n0 \, sal(n, \theta)d\theta = 0$$

Therefore, the equations (3) and (4) yield as follows:

$$a_n = \int_0^1 Ne(\theta)cal(n, \theta)d\theta \quad (3A)$$

$$b_n = \int_0^1 Ne(\theta)sal(n, \theta)d\theta \quad (4A)$$

To put the foregoing operation into practice, assuming that the speed error signal is represented by Ne(j) when using an encoder (speed detector) 5 which generating P number of pulses in every rotation, $$Ne(j) = \sum_{n=1}^{\infty} \left\{ An \cdot sal\left(n, \frac{j}{P}\right) + Bn \cdot cal\left(n, \frac{j}{P}\right) \right\} \quad (5)$$

$$An = \frac{1}{P} \sum_{l=1}^{P} Ne1 \cdot sal\left(n, \frac{l}{P}\right) \quad (6)$$

$$Bn = \frac{1}{P} \sum_{l=1}^{P} Ne1 \cdot cal\left(n, \frac{l}{P}\right) \quad (7)$$

where Ne1 represents a motor speed error calculated from lth ($1 \leq l \leq P$) pulse period of an encoder signal. Therefore, to detect a speed fluctuation from the speed signal Nf, the operations of the equations (6) and (7) are executed, at which time information of a cosine Walsh function and a sine Walsh function are needed. Such information is previously stored in the ROM 36.

The general structures of the constituent elements indicated by a dotted-line frame in FIG. 3, which are novel elements, will now be described.

The constituent elements within the dotted-line frame are a counter 10 for outputting a count value (equivalent to 1 of the equations (6) and (7)) according to a pulse from the speed detector 5, function generating means 11, 16 for outputting a step function value to be determined according to this count value, fluctuation component detecting means 13, 18 for finding a speed error fluctuation component based on both the step function value and a speed error signal Ne from the speed comparing means 51, subtracting means 55, 56 for inverting the symbol (+ or −) of the speed error fluctuation component, controlling and operating means 14, 19 for finding a sum for integrating and controlling the inverted speed error fluctuation component, function generating means 12, 17 for outputting the step function value to correcting signal generating means 15, 20, and the correcting signal generating means 15, 20 for generating correcting signals Ic1, Ic2 from the results of the controlling and operating means 14, 19 and the function value.

The correcting signal generating means 15, 20 includes an adding means 54 finds a sum of the correcting signals Ic1 and Ic2 to output a speed error correcting signal Ic.

For finding cal(n,θ) and sal(n,θ) respectively, there are provided two sets of the function generating means, the fluctuation component detecting means, the controlling and detecting means and the correcting signal generating means. In the presence of plural high-frequency components to be corrected, blocks as many as such components, i.e., three blocks indicated by dotted lines must be required when calculation is to be made where n=1, 5 or 7.

In the controlling and operating means 14, 19, summing is made for integration and control. This invention should by no means be limited to this specific example; it may be a proportional control of a proportional and integrating control.

The function generating means are provided respectively and independently for the fluctuation component detecting means 13, 18 and the correcting signal generating means 15, 20 in order to supply function values in difference phase to the fluctuation component detecting means 13, 18 and the correcting signal generating means 15, 20. However, even a single function generating means would not deteriorate the result of this invention.

A practical way of eliminating the speed fluctuation will now be described in connection with FIG. 3.

While the motor 8 makes a single complete rotation, the equations (6) and (7) are operated to detect a speed fluctuation component. This is performed by the fluctuation component detecting means 13, 18 of FIG. 3; therefore, a feedback control system must be such that a target instruction is zero. Then the following equations will be operated:

$$Sn = Sn + (-An) \quad (8)$$

$$Cn = Cn + (-Bn) \quad (9)$$

This is the control operation shown at 14 and 19 of FIG. 3. In the illustrated example, this control operation is an integrating control having an integration gain '1'. Alternatively, a proportional control, a proportional and integrating control or the like, having respective gains, may be used.

The following equations were used to generate a signal for correcting the speed fluctuation based on this result.

$$Ic1 = Sn \cdot sal\left(n, \frac{j}{p}\right) \quad (10)$$

$$Ic2 = Cn \cdot cal\left(n, \frac{j}{p}\right) \quad (11)$$

This is the content of the operation to be performed by the correcting signal generating means shown at 15 and 20 in FIG. 3. Namely, the equation (10) represents a sine Walsh component of the alternate number n, and the equation (11) represents a cosine Walsh component of the alternate number n. Using Sn and Cn obtained from the equations (8) and (9) during the i-th rotation, the operation of the equations (10) and (11) are performed during the (i+1)th rotation.

As a result, $$Ic = Ic1 + Ic2 \quad (12)$$

is outputted as the correcting signal shown at Ic in FIG. 3. As is apparent from the equation (5), this will have a waveform reverse in phase to the speed fluctuation component of the alternate number n. Then this correcting signal Ic is added to Is of FIG. 3 to cancel the speed fluctuation.

Alternatively, a proportional gain K of the speed control system may be varied by the correcting signal, with the same result.

Although it is ideal that the foregoing processes are executed for the components of alternate numbers existing infinitely, it is practically impossible to realize such processes in view of the processing time. Consequently, in practice, the processes for only influential components of large alternate numbers are executed.

Further, since the equations (10), (11) and (12) will be constant in result if Walsh functions have a constant value, operations are performed at the point where Walsh functions are varied. If there is no change in Walsh function value, the previous value is maintained so that the operating time is reduced, causing the same result.

As the result of the equation (12), a signal reverse to the speed fluctuation component is added a correcting signal to the current instruction. However, regarding the components of high alternating numbers, there is a possibility that a delay will occur in the response of a real motor with respect to the added correcting signal due to the inertia of the motor. Therefore, it is desirable to advance the correcting signal in phase.

To realize this, the following equations in stead of the equations (10) and (11) are also effective.

$$Ic1 = Sn \cdot cal\left(n, \frac{i}{p}\right) \quad (13)$$

$$Ic2 = -Cn \cdot sal\left(n, \frac{i}{p}\right) \quad (14)$$

According to this, it is possible to advance the phase of the correcting signal by $\pi/2$(rad), without increasing the processing time.

The manner in which the foregoing control operations are processed by a microcomputer is shown in a flowchart of FIG. 4(b). FIG. 4(a) is a control table effective to execute the foregoing processes; data for controlling the Walsh functions in bits 0 and 4 and the flow of program in the remaining bits are stored in control table of the ROM 36.

According to the control table and flowchart, the number of pulses for every rotation of the encoder 5 is 24, and the speed fluctuation component such that the alternate number for every rotation of the motor is 1 is corrected, and the phase of the correcting signal is not advanced.

As shown in FIGS. 4(a) and 4(b), an speed instruction Ns and a speed Nf are fetched at steps 41 and 42, and then a speed error Ne is calculated (Ne=Ns-Nf) from the fetched speed instruction Ns and the real speed Nf at step 43, whereupon at step 44, the speed error is multiplied by a proportional gain K for proportional control. At step 45, the counter value I is incremented.

At step 46, the counter value I is fetched into the control table as a pointer. At step 47, an examination is made whether the bit 0 of the fetched control table is "0" or "1", and branching is made. If the bit state is "1", steps 50 and 51 are executed. If it is "0", steps 48 and 49 are executed. At steps 48 and 49, the equation (6) is executed, while at steps 49 and 51, the equation (10) is executed. Thus, in block 1, a sine Walsh function component is detected in the speed fluctuation to generate a correcting signal Ic1.

Then, at step 52, an examination is made whether the bit 4 of the fetched control table is "0" or "1", and branching is made. If the bit state is "1", steps 55 and 56 are executed. If it is "0", steps 53 and 54 are executed. At steps 53 and 55, the equation (7) is executed, while at steps 54 and 56, the equation (11) is executed. Thus, in block 2, a cosine Walsh function component is detected in the speed fluctuation to generate a correcting signal Ic2.

Subsequently, at step 57, branching is made, depending on whether the bit 7 of the fetched control table is "0" or "1". If this bit state is "1", the equations (8) and (9) are executed at steps 58 and 60, respectively. At steps 59 and 61, a sine Walsh function component An and a cosine Walsh function component Bn are initialize. At steps 62, the counter value I is initialized. If the bit state is "0", this process is not executed. Thus, the process in block 3 is performed only once for every rotation of the motor, and an integrating control operation and various kinds of initializations are executed.

Then, at step 63 the equation (12) is executed, and at step 64 the arithmetic result is outputted to finalize the process.

In the illustrated example, the speed fluctuation component of the alternate number 1 is corrected for every rotation of the motor. Alternatively, at step 45 the speed fluctuation component of the alternate number 2 can be corrected if the added counter value I is 2. Thus, at step 45 it is possible to correct the speed fluctuation component of the alternate number L by assuming that the added counter value I is L.

Further, if the pulses of the encoder 5 are many enough compared to the alternate number L to be corrected, the speed fluctuation correcting processes in blocks 1 to 3 and step 63 are not absolutely necessary to be executed for every pulse of the encoder. For example, the Walsh function of a small alternate number, i.e., the low-frequency component may be corrected for every other pulse of the encoder. It is thereby possible to reduce the operating load of the microcomputer.

Now assume that the Walsh function is expanded by Fourier progress as follows:

$$sa1(l, t) = \frac{2}{\pi} \sum_{n=1}^{\infty} \frac{1}{2n-1} \sin\{2\pi(2n-1)l\} \quad (15)$$

$$ca1(l, t) = \frac{2}{\pi} \sum_{n=1}^{\infty} \frac{1}{2n-1} \cos\{2\pi(2n-1)l\} \quad (16)$$

Figure 5A:
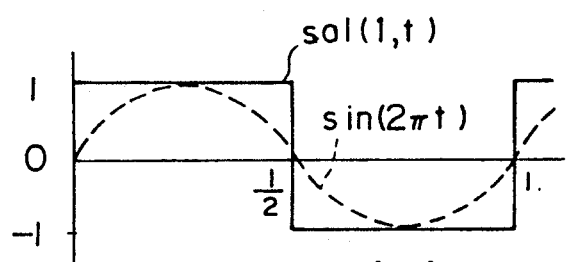
FIGS. 5(a) to 5(d) are graphs showing a typical Walsh function and a three-value function effective for reducing a threefold high-harmonic wave.
Figure 5B:
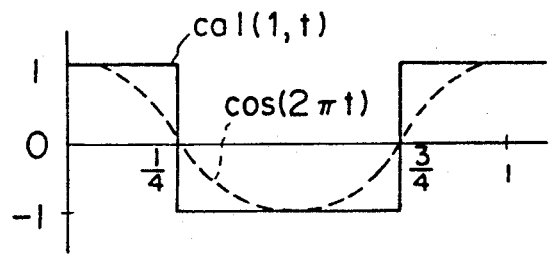

FIGS. 5(a) and 5(b) show the Walsh function (solid lines) of the alternate number 1 and its basic frequency component (dotted lines).

The Walsh function, as is seen from the equations (15) and (16), contains odd number times harmonic wave high-frequency components. On the other hand, a speed fluctuation of the motor occurs due to the unbalance of each correlation current and scarcely contains high-frequency components other than the basic frequency components. When a correction is made to this speed fluctuation by the Walsh function, a high-harmonic wave contained in a correcting signal will be a disturbance via the drive unit so that there is a possibility that odd number times harmonic wave high-frequency components occur while the basic wave components can be reduced.

Figure 5C:
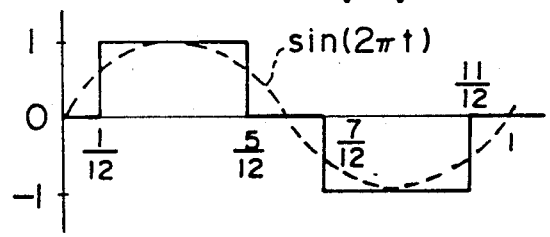
Figure 5D:
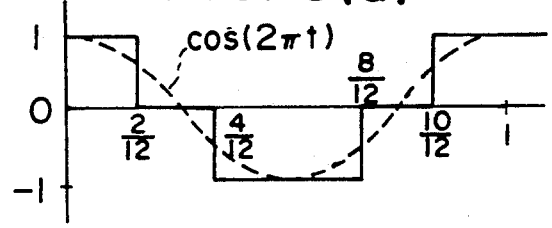

FIGS. 5(c) and 5(d) show a typical function with which a high-harmonic wave component hardly occurs. This function is composed of three values 1, 0 and −1, with which a threefold harmonic wave component in the odd number times harmonic wave high-frequency components would not occur.

The foregoing operation can be executed only by addition and subtraction, and it is therefore possible to obtained adequate speed fluctuation reducing result even by an inexpensive low-performance microcomputer.

In a simpler way of operation, the following equations may be used instead of the equations (6) and (7):

$$An = Kn \cdot \sum_{1=1}^{\infty} NF1 \cdot sa1\left(n, \frac{1}{P}\right) \quad (17)$$

$$Bn = Kn \cdot \sum_{1=1}^{\infty} Nf1 \cdot ca1\left(n, \frac{1}{P}\right) \quad (18)$$

where Kn is a proportional coefficient. And the following equations may be used instead of the equations (10) and (11):

$$Ic1 = -An \cdot sa1\left(n, \frac{i}{p}\right) \quad (19)$$

$$Ic2 = -Bn \cdot ca1\left(n, \frac{i}{p}\right) \quad (20)$$

Detecting the elements of the speed fluctuation component by the equations (17) and (18), a correcting signal is generated based on the detected signal by the equations (19) and (20). The results of the equations (17) and (18) are elements of fluctuation component added up until any speed fluctuation is eliminated. Thus, the results of the equations (17) and (18) converge to a value, finally there will be no speed fluctuation. It is therefore possible to omit the equations (8) and (9), reducing the operating load of the microcomputer.

The foregoing operating way is described in connection with the speed control of a motor. This should by no means be limited to such specific application and may be also usable for position control such as of PLL, for high-harmonic wave control of a sine wave generating circuit such as of an inverter, and for other application.

A second embodiment, in which this invention is incorporated in a VTR, will now be described in connection with FIG. 6.

Figure 6:
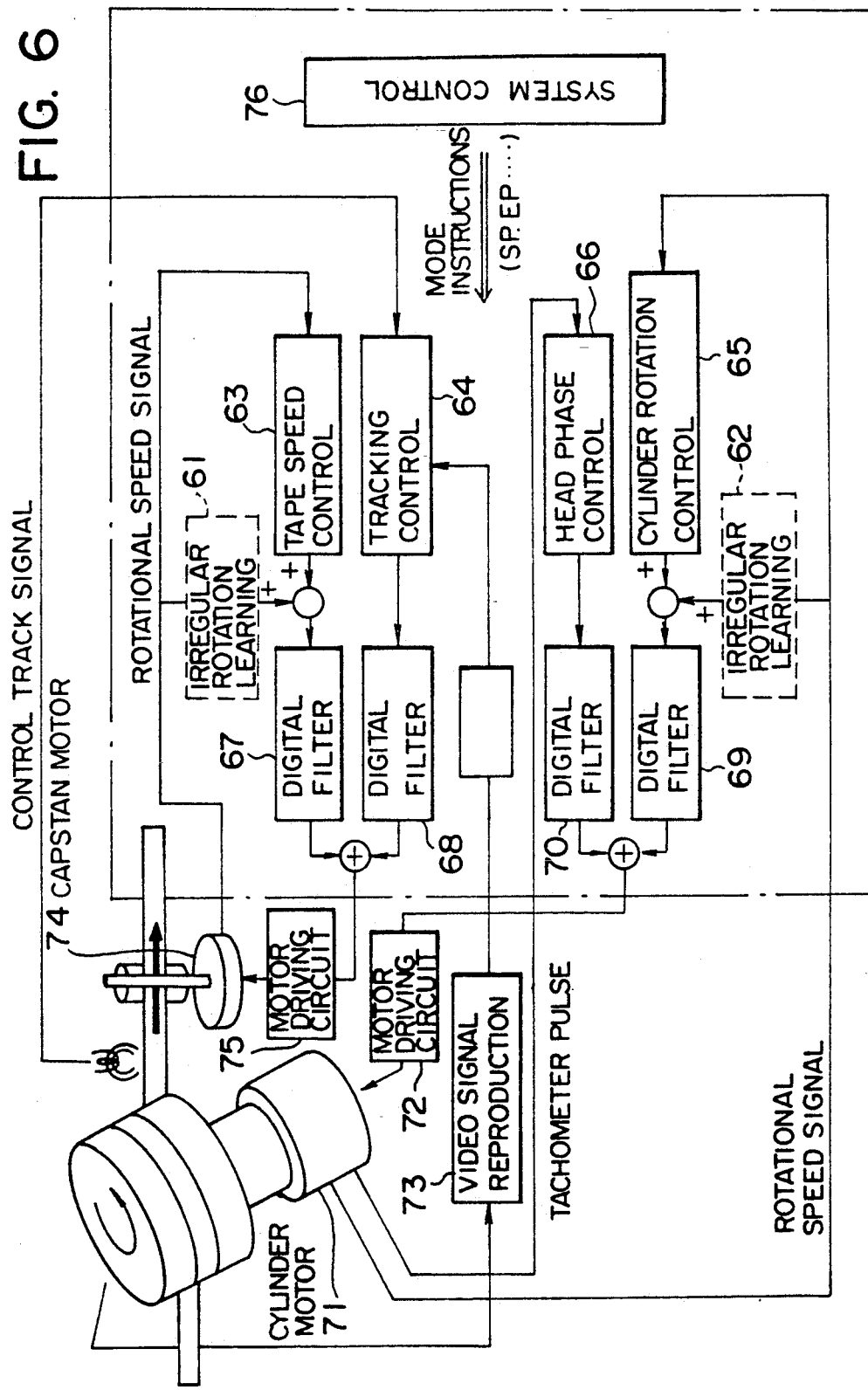
FIG. 6 is a block diagram showing the control of a motor, for a VTR, according to a second embodiment.

FIG. 6 shows the manner in which a cylinder motor 71 and a capstan motor 74 in a VTR are controlled.

The control system of the VTR is composed of a servo of the cylinder motor and a servo of the capstan motor, including control blocks called irregular rotation learnings 61 and 62 indicated by dotted lines in FIG. 6.

The servo for the capstan motor 74 includes a tape speed control 63 for controlling an average value of tape speed so as to agree with an instructed speed, the irregular rotation learning 61 for controlling a speed fluctuation, and a tracking control 64 for aligning the phase of a capstan motor 74 with that of a cylinder motor 71. The outputs of these elements of this servo are supplied to a motor driving circuit 75 via digital filters 67, 68.

The servo for the cylinder motor 71 includes a cylinder rotation control 65 for controlling an average value of tape speed so as to agree with an instructed speed, the irregular rotation learning 62, and a head phase control 66 for aligning the phase of the capstan motor 74 with that of the cylinder motor 71. The outputs of these elements of this servo are supplied to a motor driving circuit 72 via digital filter 69, 70.

The operation of the speed control apparatus will now be described.

These motors are usually brushless motors but may be those having brushes. The cylinder motor 71 has an abrasion load between the cylinder and the tape, while the capstan motor 74 has a tape load. Further, each motor has a factor for causing a torque ripple and/or a cogging torque. The motor varies in speed due to such load change and pulsating torque. Each motor has a speed detector (not shown) for generating a rotational speed signal. As the speed detector, an encoder, a frequency-generator, a tacho-generator or a pulse-generator may be used. The cylinder motor 71 and the capstan motor 74 are controlled by four kinds of controls, i.e. the tape speed control 63, the cylinder rotation control 65, the tracking control 64 and the head phase control 66.

The tape speed control 63 and the cylinder rotation control 65 control plural mode instructions to be issued from a system control 76, and also control the respective motor speeds from the rotational speed signals from the speed detectors of the respective motors according to the respective mode instructions. This control is a proportional (P) control. Using the digital filters 67, 69, the control output compensates the gain and the phase so as to make the control system stable. These digital filters 67, 69 may be analog filters having the same characteristics; these outputs are supplied to the motor driving circuits 72, 75 to drive the motors at respective desired rotational speeds.

Meanwhile, the tracking control 64 and the head phase control 66 align the phases of the two motors with each other for recording and reproducing a video signal accurately.

Although these control blocks are known in the art, this invention includes novel elements indicated by the dotted-line frame in FIG. 6, which are the irregular rotation learnings 61, 62 for preventing any irregular rotation.

With this arrangement, it is possible to minimize irregular rotations of the two motors so that a stable video image can be recorded and reproduced.

In the illustrated example, the speed control apparatus is incorporated in a VTR. Alternatively, it may be applied to a spindle motor of a floppy disk drive unit, a polygon mirror drive motor of a laser printer, cylinder and capstan motors of a digital audio tape unit, a linear motor, etc.

Figure 8:
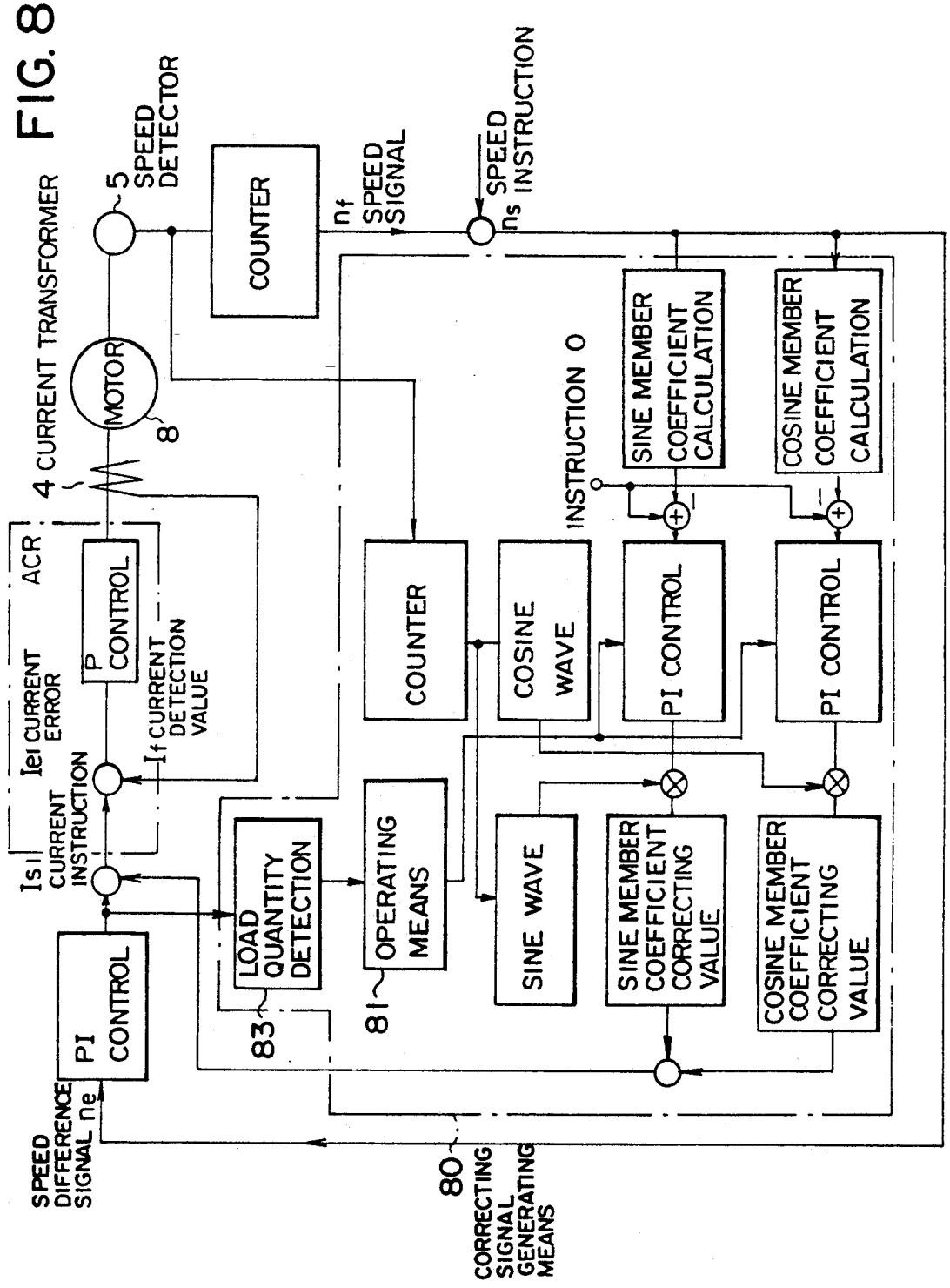
FIG. 8 is a block diagram showing a typical correcting signal generating means of the speed control apparatus.

FIG. 8 is a block diagram showing a more specific embodiment of the speed control apparatus.

In FIG. 8, a speed signal is calculated by counting the pulses of a reference oscillator (clock or counter in a microcomputer) which pulses are to be inserted in inter-pulse spaces of the speed detector (encoder) 5 and by finding its reverse number. The resulting speed signal $n_f$ is fetched in the microcomputer.

In the microcomputer, according to software, a speed difference signal $n_e$ is calculated from a difference between a speed instruction $n_s$ and the speed signal $n_f$, and after proportional integration control (PI control), a new current instruction Is1 is outputted.

The current control is constructed as hardware and calculates a current error Ie1 from the current instruction Is1 given based on the speed instruction $n_s$ and a current detection value $I_f$ obtained from a current transformer 4 and supplies a current to the motor 8 via an automatic current regulator ACR.

In FIG. 8, illustration of an inverter is omitted for clarity.

This embodiment is similar in general construction to the prior art and additionally has a correcting signal generating means 80, as a novel element, indicated by a dotted-line frame in FIG. 8. Specifically, the speed control apparatus is equipped with functions for finding individually a sine member coefficient and a cosine member coefficient of an arbitrary harmonic wave (frequency) component contained in the speed signal $n_f$ or speed difference signal $N_e$, performs a proportional control (P control) or a proportional integration control (PI control) by an instruction value to nullify them, generates a correcting signal by calculating a sine value and a cosine value with respect to the position, and adds the correcting signal to the current instruction Is1. In this embodiment, a single harmonic wave is illustrated. But the same correcting signal generating means may be used also for plural harmonic wave components.

Further, arbitrary harmonic components to be detected and its number can be changed freely depending on the individual object motor.

This invention further includes a load quantity detecting means 83, an operating means 81 for operating the relation between a quantity of load and the correction value, and a means for modifying the value of the PI control output according to the detected load quantity.

In general, a torque ripple causing a speed fluctuation includes a cogging torque which is constant, irrespective of the load, a torque constant which is proportional to the load. If correcting values corresponding to the load are previously learned by the means for operating the relation between the load quantity and the correcting value, and if the correcting value is modified by an extent corresponding to the load change quantity obtained by the load detecting means when the load varies, it is possible to make a response quickly.

The principle in which the speed ripples are reduced by the speed control apparatus will now be described.

Figure 9:
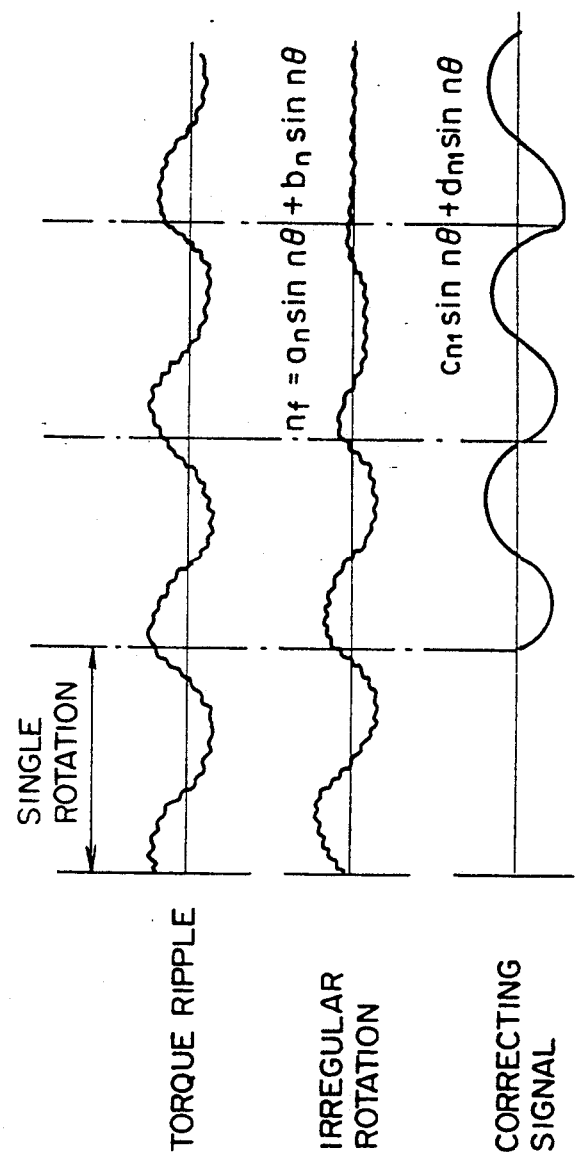
FIG. 9 shows the relation between an irregular rotation of an object to be controlled and a correcting signal.

FIG. 9 shows the state of speed fluctuation for every rotation of the motor 8. The number of pulses generated by an encoder for every rotation is N, and the arithmetic operation for speed detection is performed once in a single interpulse space. The speed signal $n_f$ is found as a reverse number to the number of pulses of the reference oscillator of a microcomputer which pulses are to be inserted in interpulse spaces of pulses of the encoder 5. The speed signal $n_f$ measured by a real speed detecting counter is as shown in FIG. 9

In general, the speed signal $nf(\theta)$ can be expanded to respective frequency components according to the following equation:

$$Nf(\theta) = n0 + \sum_{n=1}^{\infty} an \sin n\theta + bn \cos n\theta \quad (21)$$

where n0 is a direct current component, a.MDSD/n.MDNM/ is a sine member coefficient, $b_n$ is a cosine member coefficient, and n is the number of pulses for every rotation.

FIG. 9 shows only the irregular rotation components of the equation (21). The respective absolute values of n0, $a_n$ and $b_n$ for arbitrary frequency components are represented by the following equations:

$$n0 = \frac{1}{2\pi} \int_{-\pi}^{\pi} nf(\theta)d\theta \quad (22)$$

$$an = \frac{1}{\pi} \int_{-\pi}^{\pi} nf(\theta)\sin n\theta d\theta \quad (23)$$

$$bn = \frac{1}{\pi} \int_{-\pi}^{\pi} nf(\theta)\cos n\theta d\theta \quad (24)$$

Assuming that integrating control (through proportional integrating control is represented in FIG. 8, only integrating control is represented here for clarity) is made for the sine member coefficient $a_n$ and the cosine member coefficient $b_n$ for arbitrary frequency components to nullify them, it is possible to generate a correcting signal which is reverse in phase to the torque ripple, thus minimizing irregular rotations. The sine member coefficient $c_{ni}$ and the cosine member coefficient $d_{ni}$ of the correcting signal can be calculated by the following equations:

$$C_{ni} = C_{ni-1} + kxa_{ni} \quad (25)$$

$$d_{ni} = d_{ni-1} + kxb_{ni} \quad (26)$$

subscripts i and i−1 represent i-th and (i−1)th values, respectively.

FIG. 9 shows an example in which irregular rotations occur due to the torque ripple component having one period for every rotation and in which a correcting signal is generated by detecting the pulsating components of the irregular rotation. The sampling period for correction is 1/rotation.

If a torque ripple occurs as a torque constant varies with respect to the rotational position like a 120°-conducting brushless motor, a sine member coefficient and a cosine member coefficient of a new correcting signal must be generated when the load is varied.

Figure 10:
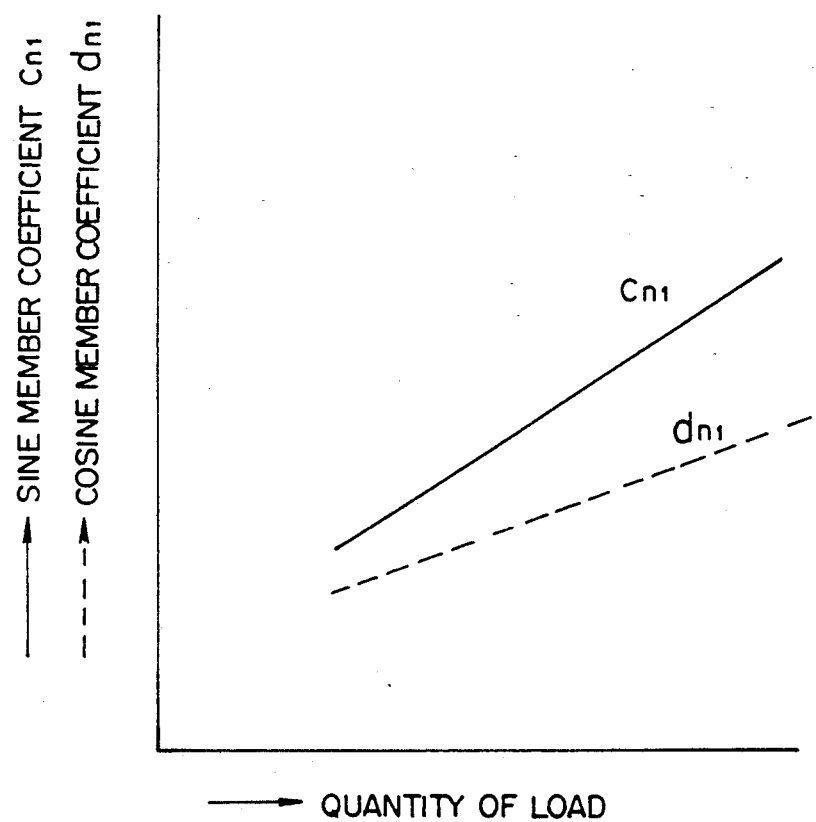
FIG. 10 shows the relation between a quantity of load and a sine member coefficient of the correcting signal and the relation between a quantity of load and a cosine member coefficient of the correcting signal.

On the other hand, between the quantity of load and a correcting signal for the sine member coefficient $C_{n1}$ and the cosine member coefficient $d_{n1}$, it is often usually the case there exists a constant relation as shown in FIG. 10. The reason why the sine member coefficient $c_{n1}$ and the cosine member coefficient $d_{n1}$ of the correcting signal will not be nullified even in the absence of any load is that there is the torque fluctuation component not dependent from the load such as of cogging torque. As shown in FIG. 8, assuming that the speed control apparatus of this embodiment includes a load quantity (represented in this case by an average value of motor current) detecting means, a means for normally detecting the relation between a sine member coefficient $c_{c1}$ and a cosine member coefficient $d_{n1}$ of the correcting signal corresponding to the load quantity, and modifying the sine member coefficient $c_{n1}$ and the cosine member coefficient $d_{n1}$ soon by such detected value of the load quantity, it is also possible to make a quick settlement even when the load fluctuation is large, thus keeping the motor rotating smoothly.

When the change of load quantity is small, it is preferable to provide a means for stopping the operation of the correcting signal modifying means; in which case, it is unnecessary to perform the correcting operation, causing a quicker control.

FIG. 11 is a flowchart showing the processing procedures in which this invention is put into practice by a microcomputer. In this illustrated example, the torque fluctuation is settled once for every rotation. Further, the speed control is made every time a signal of the encoder 5 is received.

At steps 111 and 112, a speed instruction $n_s$ and a speed signal $n_f$ are fetched.

At step 113, a speed difference signal $n_e$ is calculated by $n_e = n_s - n_f$, based on the fetched speed instruction $n_s$ and a real speed signal $n_f$.

At step 114, a proportional member P for the P control is calculated by $P = K \cdot n_e$.

At step 115, a discrimination is made as to whether it has reached a sampling time for coefficient calculation of the frequency component of a speed ripple (fluctuation).

If it has reached, calculation of a sine member coefficient $a_n$ and a cosine member coefficient $b_n$ of the speed fluctuation is performed by the equations (22) and (23) at step 116.

At step 117, a sine member coefficient $c_{n1}$ and a cosine member coefficient $d_{n1}$ of the correct value are calculated.

At step 118, an average quantity of load for a single rotation is calculated, and at the same time the relation between the load quantity and the sine member coefficient $c_n$ and the cosine member coefficient $d_n$ of the correcting value is found.

At step 119, calculation is performed for every several pulses of the encoder, and the correcting value is modified when the fluctuation of load quantity is large. This modification of the correcting value is performed based on the relation between the sine member coefficient $c_{n1}$ and the cosine member coefficient $d_{n1}$ of the correcting value (FIG. 10) calculated at step 118.

At step 120, a current instruction output is issued, based on both the result of calculation of the proportional member and the result of calculation of the correcting value, for the speed control.

As a result, a speed control apparatus which has an very good followability to load fluctuation can be achieved. In the foregoing processing procedures, the load is evaluated in terms of a current value. If the number of rotations is varied by a load, the load may be evaluated in terms of the number of rotations.

FIG. 8, the speed control apparatus is described. In general, if a system for controlling the drive of an object unit comprises: a control unit for driving and controlling the object unit; a driver for giving a current or a voltage to the object unit, based on an instruction value from the control unit; an element for detecting a real operating state of the object unit in terms of a current or a voltage; means for detecting a harmonic wave contained in the detected electrical signal; means for generating a correcting signal for canceling the detected harmonic wave component; means for detecting a quantity of load of the object unit; and means for modifying the correcting signal, based on a relation between the detected quantity of load and the correcting signal, this invention can be also used for other control apparatuses such as a position control apparatus and a torque control apparatus.

In the illustrated embodiment, the control mode is a PI control. If the control mode includes at least one of the proportional control and the integrating control, this invention can also be carried out in combination with various kinds of control modes.

In particular when this invention is incorporated in a speed control apparatus of a servo motor in a VTR, deterioration of image would be markably minimized, compared to the conventional VTR.

Further, it is effective that using together with the step function generating means, load quantity detecting means, and operating means according to the present invention. That is, calculated amount by a microcomputer can be reduced, and the rotation of a motor can be quickly stabilized by rapid response to a change of load quantity.

In the preferred embodiments, the fluctuation component detecting means detects a speed error fluctuation component by integrating a product of the function value according to the step function generating means and the speed error signal according to the speed error detecting means. However, the present invention is not limited to this. Instead, the fluctuation component detecting means may detects a speed error fluctuation component by integrating a product of the function value according to the step function generating means and the speed signal according to the speed detecting means, by which the same effect can be obtained.

In the prior art technique, an expensive arithmetic and operation unit is necessary in which very many multiplications and additions are executed at high speed, when performing Fourier progress expansion and Fourier reverse transformation, thus a lot of time is taken to perform such mathematical operations.

According to this invention, it is possible to provide a speed control apparatus in which for sampling features of a speed fluctuation and generating a speed fluctuation correcting signal, an arithmetic operation can be simplified and can be performed by an inexpensive arithmetic and operation unit, thus requiring no expensive arithmetic and operation unit. As a result, a motor speed control apparatus which is inexpensive and suitable for a VTR requiring a high and constant speed operation can be achieved.

It is also possible to provide a motor speed control apparatus in which speed fluctuations of a motor can be reduced, having a quick response to load fluctuations, for example.

This invention is also be applicable to a linear motor.

What is claimed is:

1. An apparatus for controlling the speed of a moving object, comprising a speed detecting means for detecting the speed of the moving object, a speed control means for generating a current instruction or a voltage instruction from a speed instruction signal and a speed detection signal which is obtained from said speed detecting means, and a drive means for varying the speed of the moving object according to the instructions of said speed control means, wherein said speed control means includes:

(a) a speed error detecting means for obtaining a speed error signal from a difference between the speed instruction signal and the speed detection signal which is obtained from said speed detecting means;

(b) a step function generating means for generating a step function value;

(c) a fluctuation component detecting means for detecting a speed error fluctuation component by integrating a product of the function value according to said step function generating means and the speed error signal according to said speed error detecting means; and (d) a correcting signal generating means for generating a speed error correcting signal by adding the speed error fluctuation component according to said fluctuation component detecting means by the function value according to said step function generating means.

2. An apparatus according to claim 1, wherein said step function generating means generates a two-value or three-value function value.

3. An apparatus according to claim 1, wherein said speed control means further includes a count means for outputting a count value as position or angle information as said speed detecting means obtains the speed detection signal, and said function generating means generates a two-value or three-value function value corresponding to the count value.

4. An apparatus according to claim 1, wherein said speed control means outputs a current instruction or a voltage instruction each time said speed detecting means obtains a new speed detection signal M times (M stands for an integer which is 2 or more).

5. An apparatus according to claim 1, wherein said correcting signal generating means is operative only in timed relation with the change of the function value according to said step function generating means.

6. An apparatus according to claim 4, wherein said correcting signal generating means is operative only in timed relation with the change of the function value according to said step function generating means.

7. An apparatus according to claim 1, wherein the function value according to said step function generating means is periodical, each of said fluctuation component detecting means and said correcting signal generating means being equipped with said step function generating means, a phase difference of the function value according to said step function generating means being zero or $-\pi/2$ rad multiplied by an integer.

8. An apparatus according to claim 4, wherein the function value according to said step function generating means is periodical, each of said fluctuation component detecting means and said correcting signal generating means being equipped with said step function generating means, a phase difference of the function value according to said step function generating means being zero or $-\pi/2$ rad multiplied by an integer.

9. An apparatus according to claim 5, wherein the function value according to said step function generating means is periodical, each of said fluctuation component detecting means and said correcting signal generating means being equipped with said step function generating means, a phase difference of the function value according to said step function generating means being zero or $-\pi/2$ rad multiplied by an integer.

10. An apparatus according to claim 6, wherein the function value according to said step function generating means is periodical, each of said fluctuation component detecting means and said correcting signal generating means being equipped with said step function generating means, a phase difference of the function value according to said step function generating means being zero or $-\pi/2$ rad multiplied by an integer.

11. An apparatus for controlling the speed of a moving object, comprising a speed detecting means for detecting the speed of the moving object, a speed control means for generating a current instruction or a voltage instruction from a speed instruction signal and a speed detection signal which is obtained from said speed detecting means, and a drive means for varying the speed of the moving object according to the instructions of said speed control means, wherein said speed control means includes:

(a) a step function generating means for generating a step function value;
(b) a fluctuation component detecting means for detecting a speed error fluctuation component by integrating a product of the function value according to said step function generating means and the speed detection signal according to said speed detecting means; and
(c) a correcting signal generating means for generating a speed error correcting signal by multiplying the speed error fluctuation component according to said fluctuation component detecting means by the function value according to said step function generating means.

* * * * *